Jan. 26, 1965 R. W. AICHROTH 3,167,322
SEAL
Filed Nov. 27, 1961 3 Sheets-Sheet 1

INVENTOR
RICHARD W. AICHROTH

BY Raymond W. Cotton

ATTORNEY

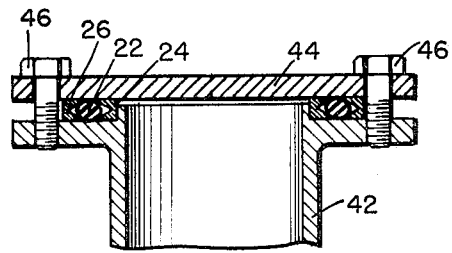
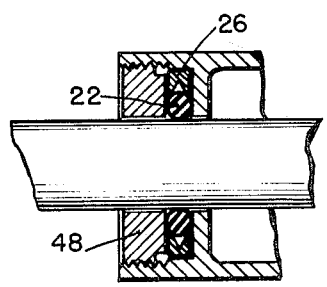
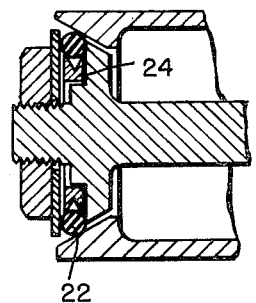
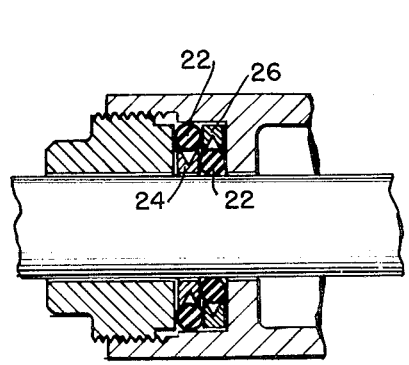
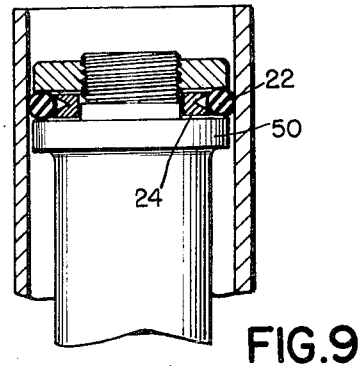

Jan. 26, 1965  R. W. AICHROTH  3,167,322
SEAL
Filed Nov. 27, 1961  3 Sheets-Sheet 3
| PART NO. | EXTERNAL RING A-O.D. | EXTERNAL RING B-I.D. | INTERNAL RING E-O.D. | INTERNAL RING D-I.D. | C | F | O RING SIZE REFERENCE I.D. | O RING SIZE REFERENCE O.D. |
|---|---|---|---|---|---|---|---|---|
| 110 | .750 | .542 | .392 | .187 | .010 | .086 | .364 | .568 |
| 111 | .812 | .602 | .452 | .250 |   |   | .424 | .630 |
| 112 | .875 | .665 | .515 | .312 |   |   | .487 | .693 |
| 113 | .937 | .727 | .577 | .375 |   |   | .549 | .755 |
| 114 | 1.000 | .790 | .640 | .437 |   |   | .612 | .818 |
| 120 | 1.375 | 1.166 | 1.015 | .805 | .010 | .086 | .987 | 1.193 |
| 210 | 1.250 | .962 | .784 | .514 | .010 | .117 | .734 | 1.012 |
| 211 | 1.294 | 1.024 | .846 | .576 |   |   | .796 | 1.074 |
| 212 | 1.357 | 1.087 | .909 | .639 |   |   | .859 | 1.137 |
| 213 | 1.419 | 1.149 | .971 | .701 |   |   | .921 | 1.199 |
| 214 | 1.482 | 1.212 | 1.034 | .764 |   |   | .984 | 1.262 |
| 215 | 1.544 | 1.274 | 1.096 | .826 |   |   | 1.046 | 1.324 |
| 216 | 1.607 | 1.337 | 1.159 | .889 |   |   | 1.109 | 1.387 |
| 217 | 1.669 | 1.399 | 1.221 | .971 |   |   | 1.171 | 1.449 |
| 218 | 1.732 | 1.462 | 1.284 | 1.014 |   |   | 1.234 | 1.512 |
| 219 | 1.794 | 1.524 | 1.346 | 1.076 |   |   | 1.296 | 1.574 |
| 220 | 1.857 | 1.587 | 1.409 | 1.139 |   |   | 1.359 | 1.637 |
| 221 | 1.919 | 1.649 | 1.471 | 1.201 |   |   | 1.421 | 1.699 |
| 222 | 1.982 | 1.712 | 1.534 | 1.264 | .010 | .117 | 1.484 | 1.762 |
SERIES 139 / SERIES 103
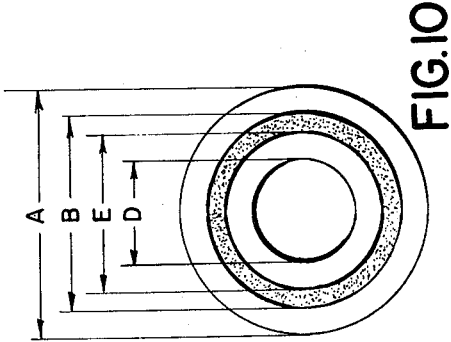
FIG. 10
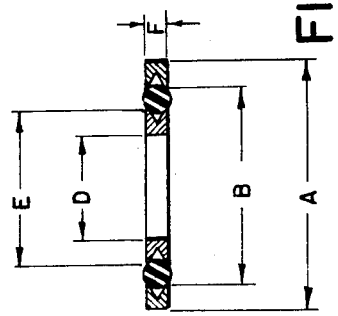
FIG. 11
FIG. 12
INVENTOR
RICHARD W. AICHROTH
BY Raymond W. Colter
ATTORNEY United States Patent Office 3,167,322
Patented Jan. 26, 1965

3,167,322
SEAL
Richard W. Aichroth, 12 Rose St., Islip, N.Y.
Filed Nov. 27, 1961, Ser. No. 155,040
2 Claims. (Cl. 277—180)

This invention relates to a seal eminently suited for static and dynamic applications.

It preferably incorporates a continuous resilient deformable moldable body of the type commonly known as an O-ring while avoiding the difficulties ordinarily encountered with the use of such O-rings. The seal contemplated by the present invention eliminates excessive compression of the O-ring, prevents creep, avoids the need for separate back-up rings, obviates the need for precision machining of the parts to which the seal is to be applied, avoids excess stretching of the O-ring, prevents twisting of the O-ring and maintains the flash marks or ridges of the O-ring out of contact with the sealing surfaces of any assembly with which it is associated.

The present invention lends itself to exceedingly simple and inexpensive assembly and disassembly, requiring no special tools for installation or dismantling. It is useful not only in conjunction with conventional seals for liquids, air and gases but it is also extremely satisfactory for sealing vacuum equipment involving pressures of the order of $1 \times 10^{-6}$ millimeters of mercury or greater and for the field of cryogenics.

It is among the objects of this invention to provide a seal comprising a retainer having substantially radial walls defining its thickness and a peripheral wall containing a radially convergent groove defining a seat, and a continuous resilient deformable moldable body engaging the seat, the body in its undeformed condition having a substantially circular cross section and a diameter exceeding the thickness of the retainer. The seat may be formed in an outer peripheral wall or an inner peripheral wall of a retainer and in fact, it is contemplated that radially spaced axially co-extensive retainers provide opposed seats engaging the body. The body is preferably annular in its undeformed condition and its diameter preferably exceeds the thickness of the retainer by an amount corresponding to the minimum recommended squeeze for the body. The retainer is preferably relatively rigid and its radial and peripheral walls are preferably joined by a smoothly curved surface or radius. The radial walls of the retainer are substantially plane and parallel under all conditions, particuarly after installation of the seal has been effected. One or both radial walls of a retainer may provide an annular recess containing a relatively soft annulus of sealing material projecting axially slightly beyond such wall or walls to effect a further seal between the retainer and a surface abutting it.

When a seal conforming to the present invention has been installed, deformation of the resilient body permits a metal to metal contact where the retainer is composed of metal and engages a metallic surface.

A more complete understanding of the invention will follow from a description of the accompanying drawings wherein:

FIG. 2 is a plan view of a seal similar to that of

FIG. 2 is a plan view of a seal similar to that of FIG. 1;

FIG. 5 is a fragmentary sectional elevation depicting a closure incorporating the seal;

FIG. 6 is a fragmentary sectional elevation depicting a gland packing incorporating the seal;

FIG. 7 is a fragmentary sectional elevation depicting a poppet valve incorporating the seal;

FIG. 8 is a fragmentary sectional elevation depicting a stuffing box incorporating the seal;

FIG. 9 is a fragmentary sectional elevation depicting a piston incorporating the seal;

FIG. 10 is a plan view of a seal provided with dimensional information tabulated in FIG. 12;

FIG. 11 is a sectional elevation of a seal also provided with dimensional information related to FIG. 12; and FIG. 12 is a tabulation of dimensions for a large variety of seals contemplated by the present invention.

Figure 1:
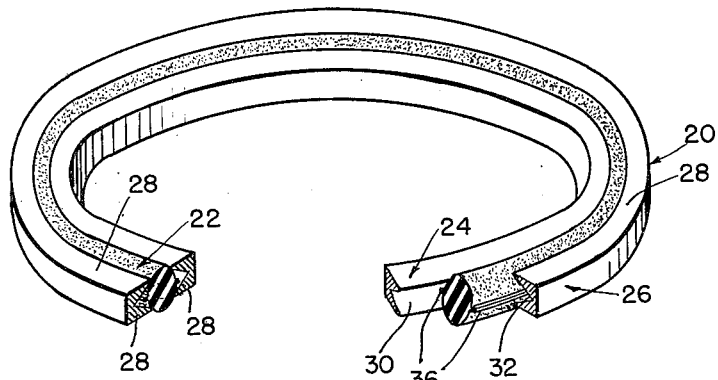
FIG. 1 is a fragmentary perspective depicting a seal conforming to the present invention.
Figure 4:
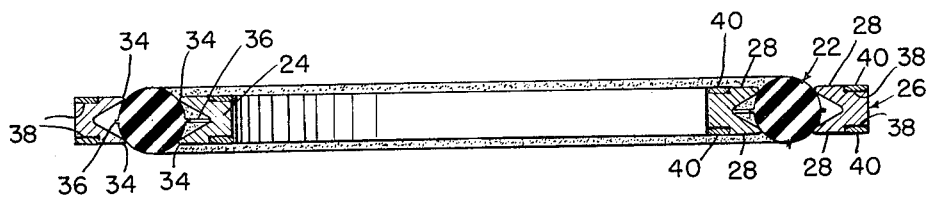
FIG. 4 is a cross sectional elevation of a seal corresponding to those of the preceding figures wherein the radial walls of the retainers contain annuli of relatively soft material.

The seal 20 depicted in FIG. 1 includes a continuous resilient deformable molded body 22, such as an O-ring, mounted between an inner retainer 24 and an outer retainer 26. The thickness of each of these retainers is the axial dimension lying between its radial walls 28, the inner retainer 24 having an outer peripheral wall containing a radially convergent groove 30 and the inner peripheral wall of the outer retainer 26 containing a radially convergent groove 32. Reference to FIG. 4 of the drawings will show clearly that the radial walls of the retainers and the walls defining their convergent grooves are joined by smoothly curved surfaces or radii 34 defining seats for the resilient body 22. It will also be noted from FIG. 4 that the diameter of the resilient body exceeds the thickness of each retainer by an amount corresponding to the minimum recommended squeeze for the resilient body so that when the seal is interposed between a pair of surfaces to be sealed, when the resilient body has been deformed sufficiently to bring the surfaces to be sealed into contact with the radial walls of the retainers, a dependable seal will have been established. The flash marks or ribs 36 found on the resilient body are disposed at 90° to its sealing surfaces in accordance with the present invention. Accordingly, these flash marks can never adversely affect the quality of the joint achieved. As the resilient body is deformed, it will be clear that its displaced volume will move into the convergent grooves, each of which has a sufficient volume to receive half of the displaced volume of the resilient body. As also depicted in FIG. 4, the radial walls 28 of the retainers are provided with annular recesses 38 for the reception of a relatively soft annulus 40 of sealing material projecting slightly axially beyond its radial wall for engagement with an abutting surface under installed conditions so as to produce a further seal between each retainer and the member abutting it.

Compositions suitable for the sealing material 40 include plastics such as Teflon and Kel–F and low melting point metals such as lead, indium, bismuth and solder. The retainers themselves may be composed of any material desired so long as it is relatively rigid.

FIG. 5 depicts a seal of the type shown in FIG. 4 applied to a flanged hollow body 42 and a cover or closure 44 clamped together by means of bolts 46. This is one example of a static seal.

In the gland packing depicted in FIG. 6, the resilient body 22 is provided with only one retainer, an outer retainer 26. The assembly is positioned by a gland nut 48 of the usual type.

As applied to the poppet valve of FIG. 7, the seal employs the resilient body 22 with only an inner retainer 24.

The stuffing box shown in FIG. 8 employs a pair of seals, one having only an inner retainer 24 and the other having only an outer retainer 26. The piston 50 depicted in FIG. 9 utilizes a seal having only an inner retainer 24.

FIGS. 10, 11 and 12 provide dimensional information permitting those skilled in the art to have a complete understanding of the contemplated seals so as to be able to produce them. The group of seals identified as Series 103 involve O-rings having a cross sectional diameter of 0.103 inch. Similarly, the seals included in Series 139 involve O-rings having diameters of 0.139 inch. An explanation of the symbols employed is as follows:

A is the outside diameter of the external ring.
B is the inside diameter of the external ring.
C is the minimum cross sectional squeeze recommended by the manufacturer of the O-ring.
D is the inside diameter of the internal ring or retainer.
E is the outside diameter of the internal retainer or ring.
F is the thickness of the retainer.

The values provided in FIG. 12 also include the inner and outer diameters of the O-ring in each case.

By virtue of the present invention, a controlled deformation of O-rings is provided in accordance with values recommended by their manufacturers. It is understood of course, by those skilled in the art that the recommended minimum cross sectional squeeze varies for static and dynamic seals, but this information is readily available from the catalogs of the O-ring manufacturers.

The maximum diameter of the inner retainer has been determined to avoid excessive stretch of the O-ring for which it is designed yet it will retain the O-ring in assembled relationship. Similarly, the inner diameter of the outer retainer has been determined so as to maintain an O-ring assembled with it without any undue deformation.

In all cases, the thickness of the retainer or retainers is less than the cross sectional diameter of the O-ring. The radial surfaces of the retainer or retainers are plane and parallel after installation and preferably even before installation. When both inner and outer retainers are employed, axial forces will not shift the O-ring because of its engagement with the walls of both retainers.

Although a limited number of examples of the invention have been described for purposes of illustration, those skilled in the art will realize the feasibility of utilizing this invention in many other applications falling within the scope of the appended claims.

I claim:
1. A seal comprising a retainer having substantially plane parallel radial walls defining its thickness and a peripheral wall containing a radially convergent groove defining a seat, and a continuous resilient deformable molded body engaging said seat, said body in its undeformed condition having a substantially circular cross section and a diameter exceeding the thickness of said retainer whereby in its undeformed condition a portion of said body extends axially beyond said retainer, said groove having a volume exceeding half the volume of said portion, one of said radial walls providing an annular recess containing a relatively soft annulus of sealing material projecting axially beyond said radial wall.

2. A seal comprising a retainer having substantially plane parallel radial walls defining its thickness and a peripheral wall containing a radially convergent groove defining a seat, and a continuous resilient deformable molded body engaging said seat, said body in its undeformed condition having a substantially circular cross section and a diameter exceeding the thickness of said retainer whereby in its undeformed condition a portion of said body extends axially beyond said retainer, said groove having a volume exceeding half the volume of said portion, said radial walls providing annular recesss containing relatively soft annuli of sealing material projecting axially beyond said radial walls respectively.

References Cited by the Examiner

UNITED STATES PATENTS

| 761,325 | 5/04 | Schier | 277—198 |
| 1,478,108 | 12/23 | Dieter | 277—227 |
| 2,844,426 | 7/58 | Glaser. | |

FOREIGN PATENTS

| 656,032 | 8/51 | Great Britain. |
| 701,614 | 12/53 | Great Britain. |
| 831,874 | 4/60 | Great Britain. |

EDWARD V. BENHAM, *Primary Examiner.*
WILLIAM FELDMAN, *Examiner.*

UNITED STATES PATENT OFFICE
CERTIFICATE OF CORRECTION

Patent No. 3,167,322 January 26, 1965

Richard W. Aichroth

It is hereby certified that error appears in the above numbered patent requiring correction and that the said Letters Patent should read as corrected below.

Figure 2:
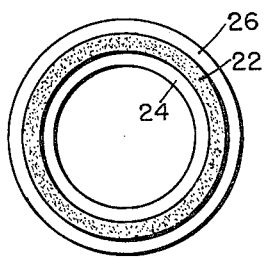
Figure 3:
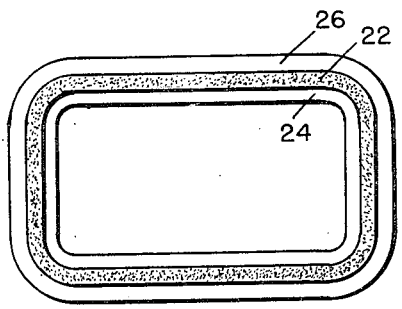
FIG. 3 is a plan view of a seal having a substantially rectangular outline.

Column 1, line 65, strike out "FIG. 2 is a plan view of a seal similar to that of"; column 4, line 28, for "recesss" read -- recesses --.

Signed and sealed this 14th day of September 1965.

(SEAL)
Attest:

ERNEST W. SWIDER
Attesting Officer

EDWARD J. BRENNER
Commissioner of Patents